(12) United States Patent
Malreddy et al.

(10) Patent No.: US 8,479,269 B1
(45) Date of Patent: Jul. 2, 2013

(54) METHOD AND SYSTEM FOR REDIRECTING UNAUTHORIZED WIRELESS COMMUNICATION DEVICES AWAY FROM A FEMTOCELL

(75) Inventors: Muralidhar Malreddy, Overland Park, KS (US); Ryan S. Talley, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 538 days.

(21) Appl. No.: 12/759,339

(22) Filed: Apr. 13, 2010

(51) Int. Cl.
*G06F 7/04* (2006.01)

(52) U.S. Cl.
USPC ........ 726/4; 726/6; 726/17; 726/21; 713/161; 713/170

(58) Field of Classification Search
USPC ...................................... 726/3–6, 1; 370/338
See application file for complete search history.

(56) References Cited

U.S. PATENT DOCUMENTS

| | | | |
|---|---|---|---|
| 8,028,327 B1 * | 9/2011 | Talley et al. ...................... 726/4 |
| 8,219,094 B2 * | 7/2012 | Huber et al. .................. 455/436 |
| 8,233,875 B2 * | 7/2012 | Kalhan ......................... 455/338 |
| 8,249,554 B2 * | 8/2012 | Mack et al. .................... 455/411 |
| 2009/0061873 A1 * | 3/2009 | Bao et al. ....................... 455/436 |
| 2009/0215452 A1 * | 8/2009 | Balasubramanian et al. 455/434 |
| 2009/0280819 A1 | 11/2009 | Brisebois et al. |
| 2009/0288145 A1 * | 11/2009 | Huber et al. ....................... 726/3 |
| 2009/0298470 A1 * | 12/2009 | Huber et al. .................. 455/411 |
| 2010/0041365 A1 * | 2/2010 | Lott et al. ...................... 455/406 |
| 2010/0048175 A1 * | 2/2010 | Osborn ......................... 455/411 |
| 2010/0118841 A1 * | 5/2010 | Kalhan ......................... 370/338 |
| 2010/0279686 A1 * | 11/2010 | Tokgoz et al. ............. 455/435.1 |
| 2010/0329132 A1 * | 12/2010 | Raghothaman et al. ...... 370/252 |
| 2011/0093913 A1 * | 4/2011 | Wohlert et al. ................... 726/1 |

OTHER PUBLICATIONS

Ravishankar Borgaonkar, Security analysis of a femtocell device, ACM Digital, Jul. 2011, pp. 95-102.*
Humblet et al., "System Design of cdma2000 Femtocells," IEEE Communications Magazine, Sep. 2009, p. 92-100.
Chandrasekhar et al., "Femtocell Networks: A Survey," IEEE Communications Magazine, vol. 46, No. 9, pp. 59-67 Sep. 2008.
Internet Networks: Wired, Wireless, and Optical Technologies, K Iniewski 2009 v.1.

* cited by examiner

*Primary Examiner* — Nathan Flynn
*Assistant Examiner* — Viral Lakhia

(57) ABSTRACT

Methods and systems are disclosed for reducing a number of unauthorized wireless communication devices (WCDs) using a femtocell. A femtocell may transmit a pilot beacon on a macro-network carrier, and may transmit one or more overhead channels on a femtocell carrier. Subsequently, the femtocell may receive a registration request from a WCD. The femtocell may then determine whether the WCD is authorized to receive wireless services from the femtocell, and if it is not so authorized, the femtocell may, during a subsequent slot associated with the unauthorized WCD in a periodically recurring slot cycle, responsively disable at least one of (i) its pilot channel and (ii) one or more of its overhead channels. As a result of the disabling, the unauthorized WCD may move away from the femtocell, perhaps handing off to the macro network.

25 Claims, 5 Drawing Sheets

METHOD AND SYSTEM FOR REDIRECTING UNAUTHORIZED WIRELESS COMMUNICATION DEVICES AWAY FROM A FEMTOCELL

BACKGROUND

Description of Related Art

1. Cellular Wireless Networks

Many people use wireless communication devices (WCDs), such as cell phones, computers, laptop computers, and personal digital assistants (PDAs), to communicate with cellular wireless networks. Service providers that operate these wireless networks typically distribute WCDs to their subscribers, perhaps by selling the WCDs at retail outlets or over the Internet, or perhaps by offering WCDs at no cost to people that subscribe to a particular service plan.

Service providers then typically assign each WCD a telephone directory number—often known as a mobile identification number (MIN) or mobile directory number (MDN)—under which a WCD may operate. Via a manual or over-the-air provisioning process, the service provider will cause the WCD to store its MIN in its Number Assignment Module (NAM). Furthermore, a WCD is typically provided at the time of manufacture with an electronic serial number (ESN), which identifies the WCD as a unique physical device.

These WCDs and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another protocol that may be used is known as Evolution Data Optimized (EV-DO), perhaps in conformance with one or more industry specifications such as IS-856. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a WCD is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket large geographic areas with coverage; as such, they are referred to generally and herein as "macro (or macro-network) base stations" and the network they collectively form—or to which they collectively belong—is referred to generally and herein as the "macro network."

WCDs and macro base stations conduct communication sessions (e.g., voice calls and data sessions) over frequencies known as carriers, each of which may actually be a pair of frequencies, with the base station transmitting to the WCD on one of the frequencies, and the WCD transmitting to the base station on the other. This approach is known as frequency division duplex (FDD). The base-station-to-WCD link is known as the forward link, while the WCD-to-base-station link is known as the reverse link.

WCDs are programmed to use a pre-determined algorithm to select one of the carriers to use in communications with a base station. When a WCD is not engaged in an active communication session, the WCD does what is known as idling on the selected carrier, which means among other things that the WCD is tuned to that carrier for receiving page messages, SMS messages, and other similar messages, and that the WCD will also send access requests for call origination and other purposes to the base station on that carrier.

2. Femtocells

Many macro-network subscribers, including private consumers and businesses, among others, in addition to having wireless service (which may include data service) for their WCD (or WCDs), also have high-speed (a.k.a. "broadband") Internet access through another communication channel. This other channel may be cable-modem service, digital-subscriber-line (DSL) service, satellite-based Internet service, T1 service, and/or some other option.

In an exemplary arrangement, a user may have a cable modem connected (a) via coaxial cable to a cable provider's network and (b) via Ethernet cable to a local wireless network (e.g., IEEE 802.11 Wi-Fi-enabled router). The router may include one or more Ethernet ports to which additional computers or other devices may also be connected, and may include wireless-access-point functionality, providing a Wi-Fi packet-data interface to, for example, laptop computers, digital video recorders (DVRs), appliances, and/or any other computing devices or wireless network adapters.

To address gaps in macro-network coverage (e.g., in buildings and homes) and for other reasons, macro-network service providers have recently begun offering their clients devices referred to herein as femtocells.

A typical femtocell may be approximately the size of a desktop phone or Wi-Fi access point, and is functionally a low-power, low-capacity version of a macro base station. Thus, a typical femtocell will use a normal power outlet, perhaps with a transformer providing a DC power supply. The femtocell may have a wired (e.g., Ethernet) or wireless (e.g., Wi-Fi) connection with the user's router and/or cable modem, and would thus have connectivity to the Internet and/or one or more other packet-data networks via the user's broadband connection. The femtocell may then also have access to the devices connected to the user's router through the router's Ethernet and/or Wi-Fi interfaces.

A femtocell may establish a virtual-private-network (VPN) connection over the Internet with an entity (e.g., a VPN terminator) on the wireless-service (macro-network) provider's core network, and thereby be able to securely communicate with the VPN terminator and other entities on that core network and beyond. The femtocell may thus provide additional functionality to WCDs it serves via access to the core network.

The femtocell also has a wireless-communication (e.g., CDMA) interface that is compatible with the user's WCD(s), such that the femtocell may act as a micro base station, providing local wireless coverage on the wireless-service provider's network via the user's Internet connection. Usually, a femtocell will provide service on a single RF carrier (or on a single carrier per technology, where multiple technologies (such as CDMA and EV-DO) are supported), and also transmit what is known as a pilot beacon, which includes administrative messages and parameters that WCDs can use to connect with the femtocell.

In particular, the pilot beacon identifies one or more of the channels at the femtocell known as the pilot, paging, and sync channels (e.g., the "overhead channels"). The femtocell's pilot channel may serve as a demodulation reference and handoff-level-measurement signal. The femtocell's sync channel may carry a repeating message that identifies the transmitting station and conveys timing and system-configuration information to the WCD. The femtocell's paging channel may provide a mechanism for the femtocell to transmit notification of incoming calls when there are no assigned traffic channels between the femtocell and a given WCD. The single RF carrier that the femtocell uses to provide service is typically different from those used by the macro network, but in some instances may be the same as one of those used by the macro network (e.g., a shared carrier).

Femtocells may also include a location-determination module (e.g., some combination of hardware, firmware, and/or software). For example, the location-determination module may comprise a Global Positioning System (GPS) receiver for receiving and decoding GPS signals for use in determination of location, as well as for use in synchronizing operations with other femtocells and with the macro network based on timing information embedded in the GPS signals. Other location-determination methods could also be used. In other instances, a femtocell may not have any location-determination module or capability.

OVERVIEW

As explained above, femtocells are typically low-cost devices that by design have a reduced set of resources and capabilities including, e.g., reduced RF power, reduced number of channel elements, and reduced RF-carrier capability as compared to macro-network base stations (BTSs). Additionally, femtocells often provide the one or more WCDs operated by their registered owners with unlimited voice and data usage when operating within the femtocell's limited coverage area. In most cases, then, both the registered owner of the femtocell and the wireless-network operator have an interest in preventing unauthorized use of a femtocell's resources: the former to, at a minimum, prevent use of resources that may otherwise be allocated to the registered owner (or owners); and the latter to prevent siphoning of revenue that would otherwise be collected from the unauthorized femtocell user for use of the carrier's macro-network resources, as well as the potential degradation of the paying subscriber's user experience, among other issues.

To address these identified issues, and others, the present methods and systems advantageously arrange and program the femtocell to recognize a registration (or perhaps an attempted registration) of an unauthorized WCD, and to redirect that unauthorized WCD to a macro-network carrier. Indeed, the present methods and systems involve femtocells arranged and programmed to carry out such avoidance and redirection of unauthorized WCDs to a macro-network carrier while minimizing any potential impact to other WCDs in the femtocell's coverage area.

In one aspect, an exemplary embodiment may include a femtocell receiving a registration request from a WCD and determining whether the WCD is authorized to receive wireless services from the femtocell. The WCD may also transmit an indication of its slot cycle to the femtocell, perhaps in the registration request. The WCD's slot cycle indicates when, how often, and for how long, the WCD, when idling, will wake-up and look for, perhaps among other things, any pending page messages and/or any pilot beacons from other network entities, such as a BTS or femtocell.

The femtocell may determine whether the registered (or registering) WCD is authorized by referencing a whitelist and/or blacklist of identifiers associated with authorized or unauthorized WCDs, respectively. Alternatively, or in addition, the femtocell may determine whether the WCD is authorized by transmitting a (e.g., SIP) message to the core wireless network and receiving an authorization response from the core network. Other methods could also be used instead of or in addition to one or more of those described.

If the femtocell determines that the WCD is unauthorized, it may take steps to redirect the WCD to a macro-network carrier in order to, among other benefits, prevent excess usage of the limited resources available at the femtocell, and to prevent unauthorized use of the unlimited voice and data service typically available via femtocells. In order to avoid negatively impacting other WCDs, the femtocell may limit its redirection attempt to periods associated with the unauthorized WCD's periodically recurring slot cycle. For example, during subsequent slots in the unauthorized WCD's periodically recurring slot cycle, the femtocell may disable the transmission of one or more of (i) its pilot channel, (ii) its paging channel, (iii) its sync channel, and (iv) its pilot beacon.

Disabling any one or more of these transmissions is likely to cause the unauthorized WCD to wake up during its respective slot cycle and, finding no or incomplete service from the femtocell, seek macro-network resources instead. More specifically, because the WCD will not be able to receive one or more of the femtocell's pilot channel, paging channel, sync channel, and pilot beacon during its respective slot cycle, the logic in the WCD may well cause it to look elsewhere for service. Most likely, the unauthorized WCD will locate a viable macro-network carrier during its respective slot cycle, and switch to idling on that macro-network carrier instead of on the femtocell's carrier. As a result of the switch, resources are freed at the femtocell to serve current and/or later-arriving authorized users. Furthermore, subsequent phone calls placed by the unauthorized WCD may be routed via the macro-network, and the subscriber account associated with that WCD will be properly billed for use of the macro-network resources. The femtocell may continue to maintain the disabled state of its pilot channel, paging channel, sync channel, and/or pilot beacon indefinitely, or perhaps for a predetermined number of subsequent slot cycles before re-enabling the transmissions. And other possibilities abound.

In a further embodiment, the femtocell may be configured to re-enable transmission of its pilot channel, paging channel, sync channel, and/or pilot beacon after disabling one or more of them for a first period of time. The femtocell may be further configured to, responsive to receiving a second registration message from the same unauthorized WCD, disable one or more of its pilot channel, paging channel, sync channel, and/or pilot beacon for a second period of time greater than the first period of time. This latter disabling may be with respect to the same recurring slot in the slot cycle, or perhaps with respect to a different recurring slot in the slot cycle now being used by the unauthorized WCD in an attempt to receive service.

In an additional embodiment, the femtocell may refrain from taking any action to redirect unauthorized users to macro-network carriers until a threshold number of unauthorized WCDs become registered with the femtocell. For example, the femtocell may refrain from any disabling until at least three or more unauthorized WCDs are registered with the femtocell. Alternatively or in addition, other thresholds perhaps could be used as well in terms of remaining available capacity (e.g., channel elements), percentage or fractional capacity, time of day, etc.

In another embodiment, the femtocell may first determine whether any authorized WCDs have a periodically recurring slot cycle identical to, or overlapping with, the unauthorized WCD's slot cycle. In order to avoid negatively affecting the service quality provided to the authorized WCD(s), the femtocell may avoid disabling any one or all of its pilot channel, paging channel, sync channel, and pilot beacon while any authorized users maintain such a slot cycle. In an embodiment, the femtocell may change the slot cycle of any such authorized WCDs, so as to facilitate ceasing the provision of service only with respect to the unauthorized WCDs.

In accordance with the foregoing embodiments, a femtocell may redirect unauthorized WCDs to a macro-network carrier while minimizing negative impacts on authorized WCDs at least in part by disabling its pilot channel, paging channel, sync channel, and/or pilot beacon during subsequent slots in the unauthorized WCD's periodically recurring slot cycle.

These as well as other aspects, advantages, and alternatives will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the claims.

BRIEF DESCRIPTION OF THE DRAWINGS

Various exemplary embodiments are described herein with reference to the following drawings, wherein like numerals denote like entities.

DETAILED DESCRIPTION

1. Exemplary Architecture

Figure 1:
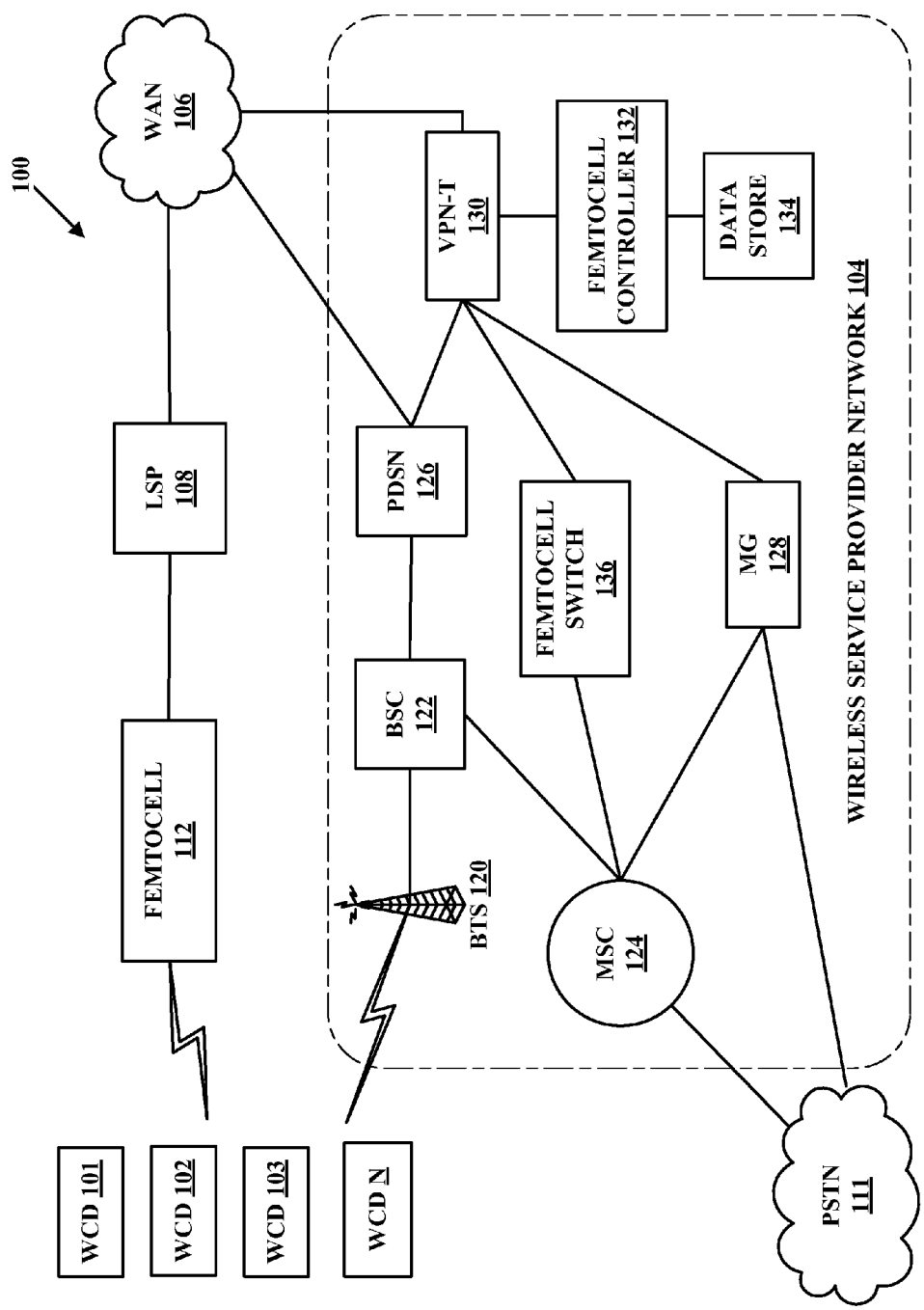
FIG. 1 is a simplified block diagram of a communication system, in accordance with at least one embodiment.

FIG. 1 is a simplified block diagram of a communication system, in accordance with an exemplary embodiment. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes: at least first, second, and third wireless communication devices (WCDs) 101, 102, and 103 but potentially including up to "N" WCDs (where N is, for example, less than or equal to 50), a wireless service provider network (WSPN) 104, a Wide Area Network (WAN) 106, a local service provider (LSP) 108, a femtocell 112, and a public switched telephone network (PSTN) 111.

The WSPN 104 includes a macro base transceiver station (BTS) 120, a base station controller (BSC) 122, a mobile switching center (MSC) 124, a packet data serving node (PDSN) 126, a media gateway (MG) 128, a VPN terminator (VPN-T) 130, a femtocell controller 132, a data store 134, and a femtocell switch 136. Additional entities could also be present, such as additional mobile stations in communication with BTS 120 and additional entities in communication with WAN 106 and/or PSTN 111, etc. Also, there could be one or more devices and/or networks making up at least part of one or more communication links.

Figure 2:
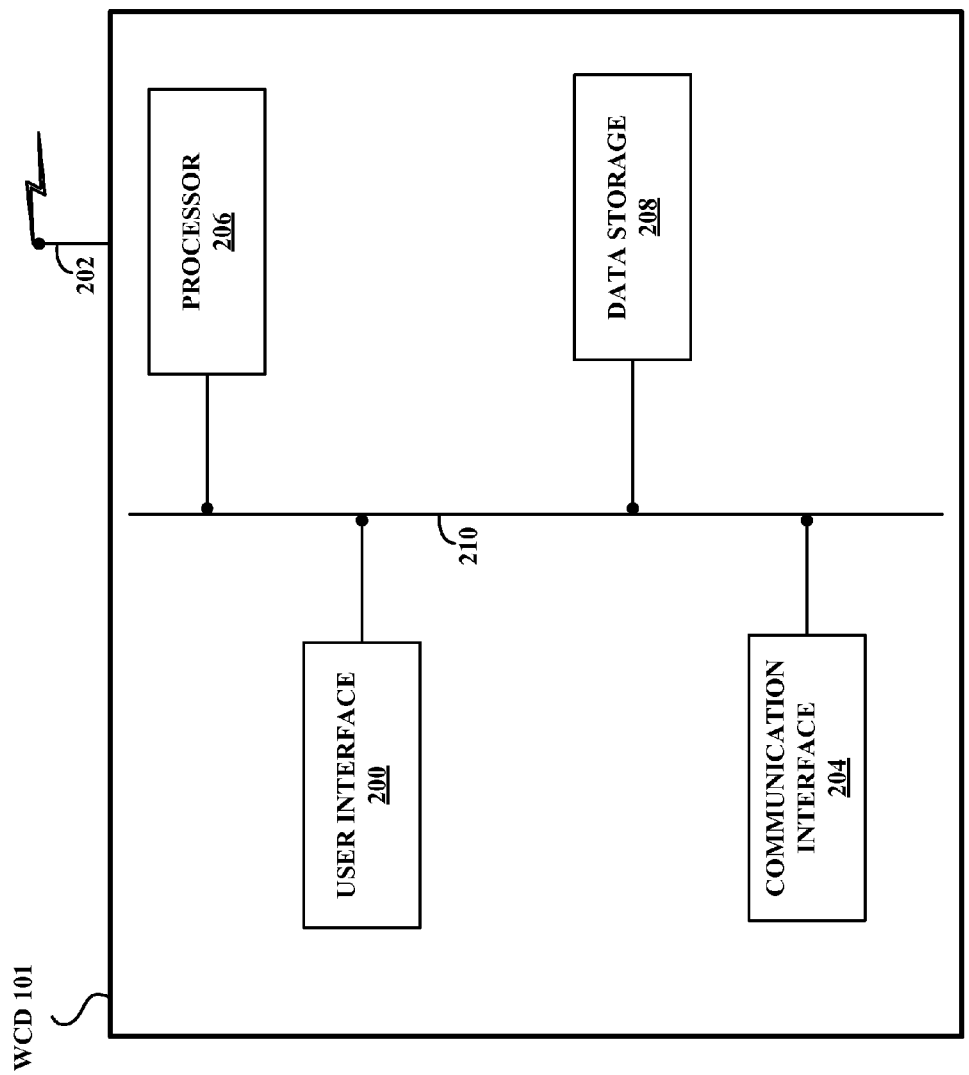
FIG. 2 is a simplified block diagram of a wireless communication device (WCD), in accordance with at least one embodiment.

WCDs 101-103 may be any mobile device arranged to carry out the WCD functions described herein. WCD 101 may be the same or different than WCD 102 and/or WCD 103. While WCD 101 will be used to describe WCD features in general, it should be understood that any of the forthcoming features described relative to WCD 101 are equally applicable to WCDs 102 and 103. FIG. 2 is a simplified block diagram of a WCD 101, in accordance with an exemplary embodiment. As shown, WCD 101 may include a user interface 200, a wireless-communication interface 202/204, a processor 206, and data storage 208 containing instructions executable by the processor 206 for carrying out WCD functions. The user interface 200 may include buttons, a touchscreen, a microphone, and/or any other elements for receiving inputs, as well as a speaker, one or more displays, and/or any other elements for communicating outputs.

The wireless-communication interface 202/204 of the WCD 101 may include an antenna 202 and a chipset 204 suitable for communicating with one or more macro base stations 108 and/or one or more femtocells 106 over suitable air interfaces. For example, the chipset 204 could be suitable for CDMA communication. The chipset 204 or wireless-communication interface 202/204 in general may also, or instead, be able to communicate with other types of networks and devices, such as EV-DO networks, Wi-Fi networks, Infrared devices, Bluetooth devices, and/or one or more additional types of networks and devices. The processor 206 and data storage 208 may be any suitable components known to those of skill in the art.

Returning to FIG. 1, WSPN 104 may encompass all or some of the network elements depicted in FIG. 1 as being included in its dashed-rectangle shape. In general, there may be more and/or different communication links among entities within WSPN 104 than those set forth in FIG. 1, and there may be more and/or different connections between WSPN 104 and outside entities. Furthermore, there may be a core packet network (not depicted) making up part of WSPN 104, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

WAN 106 may be the well-known global packet-data network generally referred to as the Internet. However, WAN 106 may also be or include one or more other packet-data networks. As such, WAN 106 may include one or more other wide area networks, one or more local area networks, one or more public networks, one or more private networks, one or more wired networks, one or more wireless networks, and/or one or more networks of any other type. Devices in communication with WAN 106 may exchange data using a packet-switched protocol such as the Internet Protocol (IP), and may be uniquely identified by an address such as an IP address.

LSP 108 may be any local service provider network that provides local packet-switched communications services to end-user residential or business customers and provides the end-user customers with access to the WAN 106. The LSP 108 may provide services to the end-user customers via data over cable service interface specification (DOCSIS), digital subscriber line (DSL), T-carrier, WiMAX, CDMA, or any other now-existing or future access technologies. The LSP 108 may, for example, provide the end-user customer with the necessary electrical medium connection from the premises of the femtocell 112 to the LSP's own network, and may provide the femtocell 112 with one or more IP addresses that may be used to send data across the LSP's network 108 and ultimately to the WAN 106. The LSP's network 108 may comprise one or more switches, routers, dynamic host configuration protocol (DHCP) servers, firewalls, and/or other devices that operate to connect end-user customers to the WAN 106.

Figure 3:
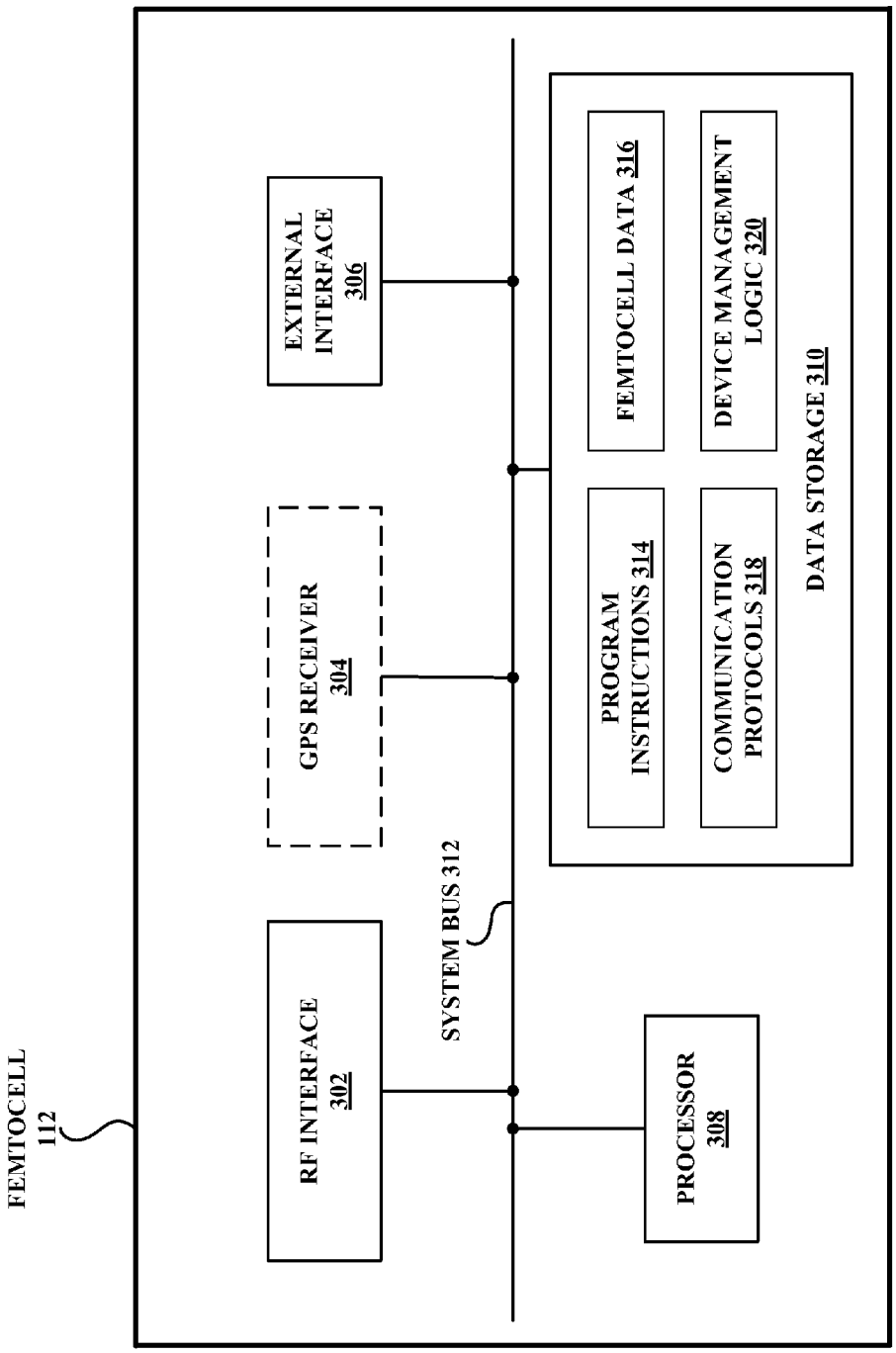
FIG. 3 is a simplified block diagram of a femtocell, in accordance with at least one embodiment.

Femtocell 112 may be any computing and communication device arranged to carry out femtocell functions. As such, femtocell 112 may include a communication interface, a processor, and data storage containing instructions executable by the processor for carrying out the femtocell functions described herein. FIG. 3 depicts an exemplary diagram of femtocell 112, which includes an RF interface 302, an optional GPS receiver 304, an external interface 306, a processor 308, and data storage 310, all communicatively linked by a system bus 312. Note that femtocell 112 could have additional and/or different components than those set forth in FIG. 3, and that this structure is provided by way of example only.

RF interface 302 may include one or more antennas, one or more chipsets, a set of one or more channel elements, and/or one or more other components suitable for providing a wireless coverage area according to a wireless-communication protocol such as CDMA (and/or one or more other wireless technologies). GPS receiver 304 may be any known or hereafter-developed GPS receiver, suitable for receiving and decoding GPS signals for location and timing purposes, perhaps among other purposes. In some embodiments, a femtocell may have a location module in addition to or instead of a GPS receiver.

External interface 306 may provide a wired and/or wireless packet-data interface for communicating with a device such as a switch/router in a local-area network (not pictured) local to the femtocell 112 or with similar devices in the LSP's network 108. Processor 308 may comprise multiple (e.g., parallel) processors, such as a general purpose microprocessor and/or a discrete digital signal processor. The data storage 310 may take various forms, in one or more parts, such as a non-volatile storage block and/or a removable storage medium, and may include (a) program instructions 314 executable by processor 308 for carrying out the femtocell functions described herein, (b) femtocell data 316, which may be any operational data or other type of data stored for use by femtocell 112, (c) communication protocols 318, facilitating and enabling communication with one or more other devices, and (d) device management logic 320, perhaps for memory and file management.

Macro BTS 120 may be any network element arranged to carry out macro-BTS functions. As such, macro BTS 120 may include a communication interface, a processor, and data storage containing instructions executable by the processor to carry out the macro-BTS functions. The communication interface may include one or more antennas, chipsets, and/or other components for providing one or more CDMA (and/or any other protocol(s)) coverage areas such as cells and sectors, for communicating with WCDs such as WCD 101 over an air interface. The communication interface may also include one or more wired (e.g., Ethernet) and/or wireless (e.g., Wi-Fi) interfaces for communicating with at least BSC 122.

BSC 122 may be any network element arranged to carry out BSC functions. As such, BSC 122 may include a communication interface, a processor, and data storage containing instructions executable by the processor to carry out BSC functions. The communication interface may include one or more wired and/or wireless interfaces for communicating with at least macro BTS 120, MSC 124, femtocell switch 136, and PDSN 126. In general, BSC 122 functions to control one or more macro BTSs such as macro BTS 120, and to provide those one or more macro BTSs with connections to devices such as MSC 124, femtocell switch 136, and/or PDSN 126.

Note that the combination of macro BTS 120 and BSC 122 may be considered a macro base station. However, macro BTS 120 or BSC 122 could, taken alone, be considered a macro base station as well. Furthermore, a macro base station may be considered to be either or both of those devices, and perhaps make use of one or more functions provided by MSC 124, PDSN 126, femtocell switch 136, and/or any other entity. And it should be noted that the macro network and/or the femtocell(s) described herein may operate according to CDMA, EV-DO, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and/or any other wireless technology or technologies now known or later developed.

MSC 124 may be any networking element arranged to carry out MSC functions. Thus, MSC 124 may include a communication interface, a processor, and data storage containing instructions executable by the processor to carry out MSC functions. The communication interface may include one or more wired and/or wireless interfaces for communicating with at least BSC 122, femtocell switch 136, and PSTN 111. In general, MSC 124 acts as a switch between (a) PSTN 111 and one or more BSCs such as BSC 122 and/or (b) between PSTN 111 and one or more femtocells 112 via femtocell switch 136, facilitating communication between WCDs 101-103 and PSTN 111.

PDSN 126 may be any networking element arranged to carry out PDSN functions. As such, PDSN 126 may include a communication interface, a processor, and data storage containing instructions executable by the processor for carrying out PDSN functions. The communication interface may include one or more wired and/or wireless interfaces for communicating with at least BSC 122, WAN 106, and VPN terminator 130. In general, PDSN 126 acts as a network access server between WAN 106 and BSCs such as BSC 122, facilitating packet-data communication between WCDs 101-103 and WAN 106 via macro base stations 120.

MG 128 may be any networking element arranged to carry out media-gateway functions. As such, MG 128 may include a communication interface, a processor, and data storage containing instructions executable by the processor for carrying out media-gateway functions. The communication interface may include a circuit-switched interface and a packet-switched interface. MG 128 may (a) receive packet-based communications from within the WSPN 104, convert those to circuit-switched communications, and pass them to PSTN 111 and (b) receive circuit-switched communications from PSTN 111, convert those to packet-based communications, and pass them to another device within WSPN 104.

VPN terminator 130 may be any networking element arranged to carry out VPN-terminator functions. Thus, VPN terminator 130 may include a communication interface, a processor, and data storage containing instructions executable by the processor for carrying out VPN-terminator functions. The communication interface may include one or more wired and/or wireless interfaces for communicating with at least femtocell controller 132, PDSN 126, femtocell switch 136, MG 128, and WAN 106. In general, VPN terminator 130 functions to establish secure VPN connections over WAN 106 with femtocells such as femtocell 112, enabling the femtocells to securely communicate with devices on the WSPN 104, such as femtocell controller 132, and perhaps beyond.

Femtocell controller 132 may be any networking element arranged to carry out femtocell-controller functions. Thus, femtocell controller 132 may include a communication interface, a processor, and data storage containing instructions executable by the processor for carrying out femtocell-controller functions. The communication interface may include one or more wired and/or wireless interfaces for communicating with at least VPN terminator 130, along with perhaps one or more other entities on WSPN 104, and beyond.

Among other functions, femtocell controller 132 communicates via VPN terminator 130 with femtocells such as femtocell 112. Femtocell controller 132 may receive requests from various femtocells for access to a data store 134. Femtocell controller 132 may perform the requested functions via data store 134 and transmit replies to the requesting femtocell 112. Femtocell controller 132 may also be operable to select various operational parameters for femtocells (e.g. carrier, PN offset, whether to broadcast a pilot-beacon, contents of any pilot beacon to be broadcast, transmission-power level, channel-list messages, candidate carriers for pilot-beacon broadcasts), and to transmit those parameters to a femtocell, perhaps along with other configuration data and messaging.

Data store 134 may provide data storage facilities accessible by the femtocell controller 132 and/or femtocell 112. Although shown separately in FIG. 1, the data store 134 may otherwise be integrated with the femtocell controller 132. Alternatively, the data store 134 may be disposed outside the WSPN 104 and accessible via the WAN 106. When disposed outside the WSPN 104, additional access and control logic may be provided for retrieving data from data store 134 in accordance with access requests from femtocells 112. The data store 134 may store and maintain, for example, one or more blacklists or whitelists for determining WCDs authorized to utilize a femtocell such as femtocell 112. For example, the data store 134 may store a blacklist that contains identifiers of WCDs that are not authorized to receive service from one or more particular femtocells, or perhaps that are not authorized to receive service from any femtocell. Alternatively, the data store 134 may store a whitelist that contains identifiers of those WCDs that are authorized to receive service from one or more particular femtocells, or perhaps that are authorized to receive service from any and all femtocells. The femtocell 112, when determining whether a particular WCD such as WCD 101 is authorized to receive wireless services from the femtocell 112, may access the data store 134 and use information retrieved from the blacklist and/or whitelist stored at the data store 134 in determining whether WCD 101 is authorized to receive services from the femtocell 112.

Femtocell switch 136 may be any networking element arranged to carry out femtocell-switch functions. As such, femtocell switch 136 may include a communication interface, a processor, and data storage containing instructions executable by the processor for carrying out femtocell-switch functions. The communication interface may include one or more wired and/or wireless interfaces for communicating with at least MSC 124 and VPN terminator 130. In general, femtocell switch 136 acts as a switch between MSC 124 and VPN terminator 130, enabling WCDs 101-103 communicating via femtocells 112 to engage in calls over PSTN 111 via MSC 124.

2. Exemplary Operation

Figure 4:
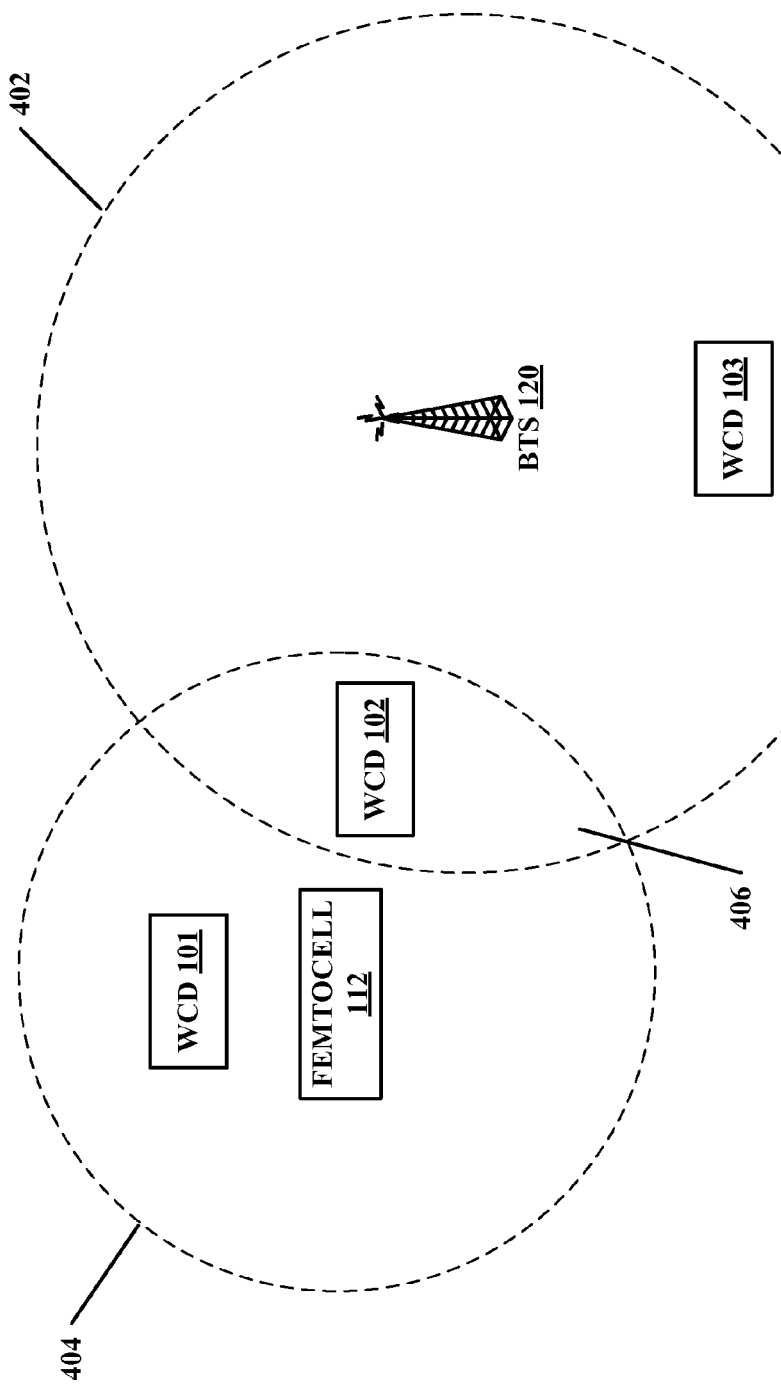
FIG. 4 is a simplified diagram illustrating multiple overlapping coverage areas in which at least one embodiment may be employed.
Figure 5:
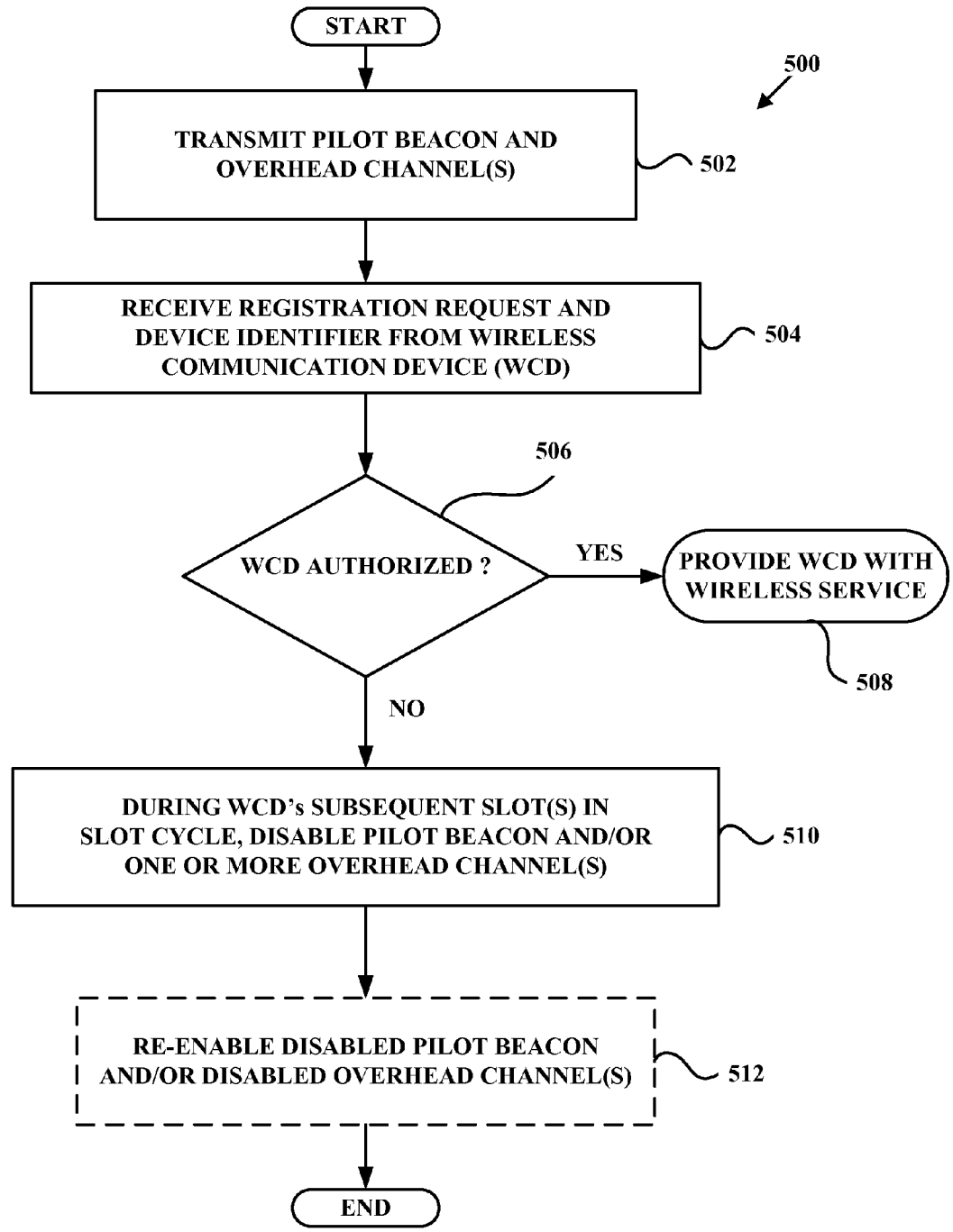
FIG. 5 is a flowchart of a method, in accordance with at least one embodiment.

FIG. 4 depicts an example arrangement of WCDs 101-103, and FIG. 5 depicts a flowchart of an exemplary method that may be executed by an exemplary apparatus, in accordance with an exemplary embodiment. In particular, FIG. 5 depicts a method 500 for a femtocell such as femtocell 112 to reduce a number of unauthorized WCDs on the femtocell 112.

As shown in FIG. 4, BTS 120 and femtocell 112 have respective coverage areas 402 and 404. Although coverage areas 402 and 404 are shown in a circular geometric area in FIG. 4 for ease of reference, actual coverage areas produced by a femtocell and a BTS will of course depend upon the terrain surrounding the respective devices. Coverage areas 402 and 404 overlap in coverage area 406, potentially allowing WCDs positioned within the overlapping coverage area 406 to receive wireless service from either femtocell 112 or BTS 120. While only WCDs 101-103 are illustrated within the coverage areas 402 and 404, it should be understood that any number of additional devices may exist within coverage areas 402 and 404. Additionally, fewer than WCDs 101-103 may exist within coverage areas 402 and 404.

For the purposes of illustrating the method and apparatus of the exemplary embodiments only, as set forth in FIG. 4, WCD 101 is positioned in coverage area 404 and is authorized to receive wireless service from, and actually receives wireless service from, femtocell 112. WCD 103 is positioned in coverage area 402 and is authorized to receive wireless service from, and actually receives wireless service from, BTS 120. WCD 102 is positioned within the overlapping coverage area 406 and may potentially receive service from femtocell 112. It is presumed, however, that WCD 102 is not authorized to receive service from femtocell 112, and is currently receiving service from the macro-network via BTS 120.

As shown in FIG. 5, the method 500 begins at step 502, when femtocell 112 transmits a pilot beacon and one or more overhead channel(s). At step 504, the femtocell 112 receives a registration request and device identifier from WCD 102. At step 506, the femtocell 112 evaluates whether WCD 102 is authorized to receive service from femtocell 112. If femtocell 112 determines that the WCD 102 is authorized to receive service, at step 508 femtocell 112 may begin providing service to the WCD 102. Alternatively, if femtocell 112 determines that the WCD 102 is not authorized to receive service, at step 510 femtocell 112 disables its pilot beacon and/or at least one overhead channel during at least one subsequent slot associated with the WCD 102 in a periodically recurring slot cycle. After a period of time, the femtocell 112 optionally re-enables the disabled channel(s) and/or pilot beacon. These steps are further described below.

i. Transmit Overhead Channel(s) and Pilot Beacon

At step 502, the femtocell 112 transmits one or more overhead channel(s) (including one or more of a pilot channel, a sync channel, and a paging channel) on a femtocell carrier, and transmits a pilot beacon on a macro-network carrier. For the purposes of this example, the macro-network carrier is the same macro-network carrier on which WCD 102 is currently receiving service from macro-network BTS 120.

As noted earlier, the pilot beacon transmitted by femtocell 112 may include messages and parameters that WCD 102 may use to initially connect with the femtocell 112 or that WCD 102 may use to facilitate handoff from the macro-network carrier (e.g., from BTS 120) to the femtocell's 112 carrier, among other possibilities. The messages and parameters in the pilot beacon may inform the WCD 102 of the femtocell carrier, and the WCD 102 may subsequently use this information to transmit a registration request to the femtocell 112 on the femtocell's 112 carrier.

The femtocell's 112 pilot channel may serve as a demodulation reference and handoff level measurement signal for a WCD. The femtocell's 112 sync channel may carry a repeating message that identifies the transmitting station and conveys timing and system configuration information to a WCD. The femtocell's 112 paging channel may provide a mechanism for the femtocell 112 to transmit notification of incoming calls when there are no assigned traffic channels between the femtocell 112 and a particular registered WCD.

The femtocell carrier may be the same carrier as the macro-network carrier being used by the BTS 120. In such a case, the femtocell 112 is described herein as providing service on a "shared carrier." In a shared-carrier scenario, femtocell 112 may not broadcast the pilot beacon on the shared carrier, but may instead broadcast the pilot beacon on all other macro-network carriers in the vicinity of the femtocell 112, or on a subset thereof.

Alternatively, the femtocell carrier may be one that is not being used by the macro network in the area surrounding the femtocell 112. In such a case, the femtocell 112 is said to be providing service on a "non-shared carrier." In a non-shared-carrier scenario, femtocell 112 may broadcast its pilot beacon on all of the macro-network carriers within the vicinity of the femtocell 112, or on a subset thereof.

In the event that a plurality of macro-network carriers are being used in the vicinity of the femtocell 112, the pilot beacon transmitted by the femtocell 112 may repeatedly hop from one macro-network carrier to another within a period of time in order to advertise the femtocell's 112 services to WCDs operating on varying macro-network carriers (e.g., a frequency-hopping pilot beacon).

In this example, WCD 102 may detect the femtocell's 112 carrier (perhaps after receiving the pilot beacon transmitted by femtocell 112 on one of the macro-network carriers) and may determine whether it should handoff service to the femtocell 112. The process of determining whether to handoff service to the femtocell 112 may take many forms, and may take into consideration many variables, including, for example, signal strengths of the respective signals received from the femtocell 112 and the BTS 120. Once WCD 102 determines that it should handoff service to the femtocell 112, it may generate and transmit a registration request and device identifier to femtocell 112.

Although the WCD 102 in this example is described as being involved in a handoff from macro-network BTS 120, WCD 102 could simply detect the femtocell's 112 carrier on its own, perhaps after powering up within the femtocell 112 coverage area 404. WCD 102 may then generate and transmit a registration request and device identifier to femtocell 112. Other examples are possible as well.

ii. Receive Registration Request and Device Identifier from WCD

In step 504, femtocell 112 receives the registration request and a device identifier from the WCD 102. In the registration request itself, or perhaps in a separate transmission, the WCD 102 may provide to the femtocell 112 the identifier that identifies the WCD 102. As set forth above, the identifier may be, for example, a MIN or an ESN associated with the WCD 102. Of course, other identifiers could also be used. For example, the WCD 102 may be programmed to transmit a userID associated with a user as an identifier. Identifiers may be globally unique among all WCD's, locally unique among a small group of WCDs, or may be shared among a large group of related WCDs. And other implementations are certainly possible.

iii. Determine Whether WCD is Authorized to Receive Service

At step 506, and responsive to receiving the registration request, the femtocell 112 may determine whether WCD 102 is authorized to receive service. The femtocell 112 may use the identifier provided by WCD 102, or some other identifier associated with the identifier provided by WCD 102, to make the authorization determination. In one embodiment, femtocell 112 may access a whitelist of authorized WCDs and determine whether the identifier is listed in the whitelist. Such a whitelist may be stored local to the femtocell 112 or remotely from the femtocell 112.

If stored at the femtocell 112, the whitelist may be stored in a local volatile or non-volatile memory of the femtocell 112, including for example, the femtocell data storage element 310. Alternatively, the whitelist may be stored remotely at a device within the WSPN 104 and accessible by the femtocell 112 via the WAN 106. The whitelist itself may be created and/or maintained by an owner or lessee of the femtocell 112, or may be created and/or maintained by the WSPN 104.

In an embodiment, the femtocell 112 may be provided with a local interface in which a registered owner may populate the whitelist with identifiers associated with WCDs that are authorized to use the femtocell 112. In the event that the whitelist is stored remote from the femtocell 112 (e.g., at the WSPN 104), the whitelist may be populated by the wireless service provider, or perhaps the wireless service may provide an interface to allow the registered owner of the femtocell 112 to access and populate the remote whitelist. The femtocell may obtain access to the remote whitelist by, for example, transmitting a session initiation protocol (SIP) message to the WSPN 104. Alternatively, the femtocell 112 may retrieve the remotely-stored whitelist via a file transfer connection. The file transfer connection may be based on the file transfer protocol (FTP), the Hypertext Transfer Protocol (HTTP), or any other known or future developed file transfer protocol. Other possibilities exist as well.

TABLE 1

Example Whitelist Structure

| Rule | Device ID's |
| --- | --- |
| Always Allowed | 101: 3125551212 |
| Allowed Saturday-Sunday | 103: E8123DDA |

Table 1 illustrates one example data structure for the whitelist. While Table 1 shows only two WCDs and two rules, the disclosed method and apparatus is equally applicable to more or less than two WCDs and more or less than two rules. Furthermore, while the WCD reference characters in Table 1 have been chosen to correspond to the reference characters in FIG. 1 for ease of reference, it should be understood that any combination of alphanumeric characters could be used as a WCD device ID.

The data shown in Table 1 may have been previously set by a user associated with the femtocell 112, or may have been set by the wireless service provider. As shown in Table 1, WCD

101 has a mobile identification number (MIN) of 3125551212 acting as a device identifier. WCD 103 has an electronic serial number (ESN) of E8123DDA acting as a device identifier. While Table 1 utilizes varying device identifier types (ESN and MIN), a single device identifier type may be used throughout the whitelist in order to provide consistency.

In addition to setting forth authorized WCD identifiers, the whitelist may also provide access rules such as those in Table 1. As shown in Table 1, a first rule sets forth that WCD 101 is always authorized to receive service from femtocell 112. A second rule sets forth that WCD 103, on the other hand, is only authorized to receive service from femtocell 112 on Saturdays and Sundays. These or other filters can be used to customize which WCDs are allowed access to the femtocell 112 and when such WCDs are allowed access to the femtocell 112. Other whitelist data structures could be used as well, which may or may not contain access rules.

Assuming that the whitelist data structure of Table 1 is now maintained at femtocell 112, and after receiving a registration request from WCD 102, femtocell 112 may determine whether WCD 102 is authorized to receive service by comparing the identifier received from the WCD 102 (or some other identifier associated with the received identifier) with the WCD identifiers stored in the whitelist. If a match is found, femtocell 112 may proceed to step 508 and begin providing WCD 102 with wireless service. On the other hand, if a match is not found, femtocell 112 may determine that WCD 102 is not authorized to receive wireless service and proceed to step 510. In this example, given the contents of the whitelist in Table 1, and because no identifier associated with WCD 102 exists in the whitelist of Table 1, femtocell 102 would determine that WCD 102 is not authorized to receive wireless services in this example.

Despite the determination that WCD 102 is not authorized to receive wireless service, femtocell 112 may, in some cases, still provide WCD 102 with wireless service for a period of time. This period of time could be used to prevent data loss to WCD 102, or could be used to gracefully redirect WCD 102 back to the macro network, perhaps prior to taking subsequent steps that may affect WCD 102 in a less graceful manner.

Of course, instead of a whitelist, a blacklist may instead be maintained locally or remotely. The operation of the blacklist may default to authorizing WCD 102 to receive service from femtocell 112 unless a matching identifier associated with WCD 102 is located in the blacklist. More specifically, if the identifier associated with WCD 102 is not present in the blacklist, the femtocell 112 may proceed from step 506 to step 508 of FIG. 5. If the identifier associated with WCD 102 is present in the blacklist, the femtocell 112 may alternatively proceed from step 506 to step 510.

In summary, responsive to femtocell 112 determining that WCD 102 is not authorized to receive wireless service, the femtocell 112 may proceed to step 510 of FIG. 5.

iv. Disable an Overhead Channel and/or Pilot Beacon Transmission During a Next Slot Associated with the Unauthorized WCD At step 510, femtocell 112 may identify a slot cycle associated with the unauthorized WCD 102, and may take steps to disable (i) one of the overhead channel(s) and/or (ii) the pilot beacon during a next slot in the identified slot cycle. In one embodiment, the femtocell 112 may identify a slot cycle associated with the unauthorized WCD 102 by receiving an indication from the WCD 102 of its "slot cycle index" (SCI) in a registration request transmitted by the WCD 102 to the femtocell 112. In order to conserve battery power, WCD 102 is arranged to operate at a given SCI, which defines the frequency or period at which the WCD 102 will wake up and check the paging channel for, perhaps among other signals, any outstanding pages and/or an availability of a stronger carrier than the carrier on which the WCD 102 is currently idling.

By disabling the transmission of one or more of its overhead channels, an unauthorized WCD 102 may wake up during its slot and detect the absence of one or more of the overhead channels required for service and, as a result, seek service elsewhere. For example, the unauthorized WCD 102 may stay with, or return to, receiving service from the macro-network via BTS 120 after detecting incomplete service availability at the femtocell 112. Similarly, by the femtocell 112 disabling the transmission of its pilot beacon, unauthorized WCD 102 may be unable to obtain the channel information necessary to register with the femtocell 112 for service. By disabling both the pilot beacon and at least one overhead channel, the femtocell 112 may further increase the likelihood of preventing an unauthorized WCD 102 from registering with the femtocell 112.

For example, WCD 102 may indicate to femtocell 112 that it is operating at a SCI of 0, which indicates that the WCD will be awake and available during a slot occurring at some multiple of 1.28 seconds from time t=0. Other SCIs may operate at different timings. The femtocell 112 and WCD 102 may also negotiate for a different SCI during registration or at some other time using subsequent message exchanges.

By limiting the disabling of the overhead channel(s) and/or pilot beacon to a period of time associated with the slot cycle of the unauthorized WCD 102, femtocell 112 can redirect the unauthorized WCD 102 back to the macro network while minimizing any potential adverse impact on any authorized WCDs currently receiving service from the femtocell 112 and on any authorized WCDs seeking out service from the femtocell 112 via its pilot channel or pilot beacon transmissions. For example, authorized WCDs having a different SCI than the unauthorized WCD 102, or having the same SCI as the unauthorized WCD 102 but offset in time from the unauthorized WCD 102 (e.g., non-overlapping), could still obtain service and avoid any negative consequences of the femtocell 112 disabling its overhead channel(s) and/or pilot beacon.

In one embodiment, the femtocell 112 may disable only one of its pilot-channel, sync-channel, and paging-channel transmissions during the slot cycle associated with the unauthorized WCD 102. In an alternative embodiment, femtocell 112 may disable two of its pilot-channel, sync-channel, and paging-channel transmissions during the slot cycle associated with the unauthorized WCD 102. In another embodiment, femtocell 112 may disable all three of its pilot-channel, sync-channel, and paging-channel transmissions during the slot cycle associated with the unauthorized WCD 102. In any one of these embodiments, femtocell 112 may also disable transmission of its pilot beacon during the slot cycle associated with the unauthorized WCD 102.

The femtocell 112 may disable the transmission of its overhead channel(s) and/or pilot beacon only for the next slot associated with the unauthorized WCD 102 in the slot cycle. Alternatively, femtocell 112 may disable the transmission of its overhead channel(s) and/or pilot beacon for a plurality of subsequent slots associated with the unauthorized WCD 102 in the slot cycle. The longer the femtocell 112 disables its transmission of overhead channel(s) and/or pilot beacons, the more likely it becomes that the unauthorized WCD 102 may stay with, or return to, receiving service from the macro network via BTS 120. Of course, at some point in time the unauthorized WCD 102 may no longer be in the vicinity of femtocell 112, and the femtocell's disabling of its overhead channel(s) and/or pilot beacon may prevent authorized WCDs newly arriving within the vicinity of WCD 102 from detecting the femtocell's service via its pilot beacon and/or pilot channel.

In one embodiment, the femtocell 112 may condition the disabling of its overhead channel(s) and/or pilot beacon upon making a determination that no authorized users currently have a slot cycle that overlaps with any portion of the unauthorized WCD's 102 slot cycle, disabling one or more of the femtocell's overhead channel transmissions and pilot beacon during a slot cycle associated with unauthorized WCD 102 may also cause authorized WCDs using overlapping slot cycles to experience service errors such as dropped calls. For example, if femtocell 112 determines that authorized WCDs are currently using a slot cycle that overlaps with the unauthorized WCD's 102 slot cycle, the femtocell 112 may delay the disabling of its channel(s) and/or pilot beacon for a period of time, refrain from disabling its overhead channel(s) and/or pilot beacon, or perhaps instruct the authorized WCD(s) that are using an overlapping slot cycle to switch to a different, non-overlapping slot cycle.

Assuming the femtocell 112 detects an overlapping slot cycle and chooses to delay the disabling, the femtocell 112 may, after a predetermined delay, re-assess whether any authorized WCDs are still using an overlapping slot cycle with the unauthorized WCD 102. At this time, if no authorized WCDs remain, the femtocell 112 may disable its overhead channel(s) and/or pilot beacon during the slot cycle associated with the unauthorized WCD 102. If, on the other hand, authorized users still remain, the femtocell may wait for a second longer delay, cancel the disabling, or instruct the authorized WCD(s) that are using an overlapping slot cycle to switch to a different, non-overlapping slot cycle. Other possibilities exist as well.

In an embodiment, the femtocell 112 may refrain from taking any action to redirect unauthorized WCDs to macro-network carriers until a threshold number of unauthorized WCDs become registered with the femtocell 112. For example, the femtocell 112 may refrain from any disabling until at least three or more unauthorized WCDs are registered with the femtocell 112. Alternatively or in addition, other thresholds could be used as well in terms of remaining available capacity (e.g. channel elements), percentage or fractional capacity, time of day, etc.

v. Re-Enable Transmission of the Disabled Overhead Channel(s) and/or Pilot Beacon In light of the potential negative effects of the femtocell 112 keeping its overhead channel(s) and/or pilot beacon disabled for an indefinite period of time, femtocell 112 may be optionally configured to re-enable transmission of its overhead channel(s) and/or pilot beacon after a period of time. For example, femtocell 112 may re-enable transmission of the disabled overhead channel(s) and/or pilot beacon after a period of 20 seconds, or perhaps more.

In one embodiment, the period of delay in re-enabling the transmission of the disabled overhead channel(s) and/or pilot beacon could be progressively increased each time the femtocell 112 receives another registration request from an unauthorized WCD. As one example, after the femtocell 112 disables its overhead channel(s) and/or pilot beacon for a period of 20 seconds, and subsequently receives another registration request from an unauthorized WCD 102, femtocell 112 may disable its overhead channel(s) and/or pilot beacon during a slot cycle associated with the WCD 102 for a period of 40 seconds. Subsequent disablings could increase that time period even further. Of course, at the time of subsequent registration requests, unauthorized WCD 102 may be operating on a differing recurring slot in the slot cycle, or at a different SCI, than before. Subsequent disablings may take these changes into consideration when determining during which slots to disable the overhead channel(s) and/or pilot beacon.

In a further embodiment, the femtocell 112 may re-enable transmission of the disabled overhead channel(s) and/or pilot beacon in stages. For example, if the femtocell 112 disabled both the pilot channel and the pilot beacon transmissions during the slot cycle associated with the unauthorized WCD 102, the femtocell may re-enable transmission of its pilot channel during the associated slot cycle some period of time before re-enabling transmission of the pilot beacon. By further delaying re-enabling of its pilot beacon during the associated slot cycle, the femtocell 112 may prevent the unauthorized WCD 102, which may now be receiving service on a macro-network carrier, from seeing the femtocell's 112 pilot beacon and re-attempting to connect with the femtocell 112. At the same time, re-enabling its pilot channel may allow other authorized WCDs having a slot cycle overlapping with the unauthorized WCD's slot cycle to begin obtaining service from the femtocell 112. Of course, the sync and paging channels could be similarly re-enabled prior to re-enabling the pilot beacon.

3. Conclusion

In accordance with the foregoing embodiments, a number of unauthorized WCDs on a femtocell may be reduced. As a result, the femtocell may prevent use of resources that may otherwise be properly allocated to the registered owner (or owners) of the femtocell, and may additionally prevent siphoning of revenue that would otherwise be collected by the carrier for the unauthorized WCD's use of the carrier's macro-network resources.

Various exemplary embodiments have been described above. Those skilled in the art will understand, however, that changes and modifications may be made to those examples without departing from the scope of the claims.

What is claimed is:

1. A method comprising:
   a femtocell transmitting a pilot beacon on a macro-network carrier, and transmitting one or more overhead channels on a femtocell carrier;
   the femtocell receiving a registration request from a wireless communication device (WCD), and evaluating whether the WCD is authorized to receive wireless service from the femtocell; and
   the femtocell making a disable determination comprising a first determination that the WCD is not authorized to receive wireless service from the femtocell, the femtocell identifying a slot cycle associated with the WCD, and responsive to making the disable determination, and based on the identifying, the femtocell disabling, during at least one subsequent slot of the identified slot cycle, at least one transmission selected from the group consisting of (i) one or more of the overhead channels and (ii) the pilot beacon, but the femtocell continuing to provide the at least one transmission in at least one slot that is associated with at least one authorized WCD.

2. The method of claim 1, further comprising conditioning the disabling on a second determination that at least a threshold number of unauthorized WCDs are currently registered with the femtocell.

3. The method of claim 1, further comprising conditioning the disabling on a second determination that no authorized WCDs that are currently registered with the femtocell are currently using a slot cycle that is the same as or overlapping with the identified slot cycle.

4. The method of claim 1, wherein the registration request comprises information indicating the slot cycle associated with the WCD.

5. The method of claim 1, wherein the at least one subsequent slot comprises a plurality of subsequent slots.

6. The method of claim 5, wherein disabling the at least one transmission during the at least one subsequent slot of the identified slot cycle comprises-disabling the transmission of the pilot beacon on the macro-network carrier for a first number of slots of the identified slot cycle.

7. The method of claim 6, further comprising the femtocell receiving a second registration request from the unauthorized WCD, and responsively disabling the transmission of the pilot beacon on the macro-network carrier during subsequent slots of the identified slot cycle for a second number of recurring slots, the second number being greater than the first number.

8. The method of claim 6, further comprising the femtocell, after disabling the transmission of the pilot beacon for the first number of slots of the identified slot cycle, re-enabling the transmission of the pilot beacon on the macro-network carrier during subsequent slots of the identified slot cycle.

9. The method of claim 1, further comprising the femtocell providing the WCD with wireless service for a period of time despite making the disable determination.

10. The method of claim 1, wherein evaluating whether the WCD is authorized to receive wireless service from the femtocell comprises checking for the presence of an identifier associated with the WCD in a whitelist of WCDs maintained at the femtocell, the method further comprising determining that the WCD is authorized when the identifier associated with the WCD is present in the whitelist.

11. The method of claim 1, wherein evaluating whether the WCD is authorized to receive wireless service from the femtocell comprises (i) transmitting an authorization request to a whitelist database external to the femtocell and (ii) examining a content of an authorization reply received by the femtocell from the whitelist database, the authorization reply being associated with the authorization request.

12. The method of claim 1, wherein the one or more overhead channels comprise at least one channel selected from the group consisting of a pilot channel, a paging channel, and a sync channel.

13. A femtocell comprising:
a communication interface;
a processor; and
data storage containing instructions executable by the processor for causing the femtocell to carry out a set of functions including:
transmitting a pilot beacon on a macro-network carrier, and transmitting one or more overhead channels on a femtocell carrier;
receiving a registration request from a wireless communication device (WCD), and evaluating whether the WCD is authorized to receive wireless service from the femtocell; and
making a disable determination comprising a first determination that the WCD is not authorized to receive wireless service from the femtocell, identifying a slot cycle associated with the WCD, and responsive to making the disable determination, and based on the identifying, disabling, during at least one subsequent slot of the identified slot cycle, at least one transmission selected from the group consisting of (i) one or more of the overhead channels and (ii) the pilot beacon, though continuing to provide the at least one transmission in at least one slot that is associated with at least one authorized WCD.

14. The femtocell of claim 13, wherein the functions further include conditioning the disabling on a second determination that at least a threshold number of unauthorized WCDs are currently registered with the femtocell.

15. The femtocell of claim 13, wherein the functions further include conditioning the disabling on a second determination that no authorized WCDs that are currently registered with the femtocell are currently using a slot cycle that is the same as or overlapping with the identified slot cycle.

16. The femtocell of claim 13, wherein the registration request comprises information indicating the slot cycle associated with the WCD.

17. The femtocell of claim 13, wherein the at least one subsequent slot comprises a plurality of subsequent slots.

18. The femtocell of claim 17, wherein disabling the at least one transmission during the at least one subsequent slot of the identified slot cycle comprises; disabling the transmission of the pilot beacon on the macro-network carrier for a first number of slots of the identified slot cycle.

19. The femtocell of claim 18, wherein the functions further include receiving a second registration request from the unauthorized WCD, and responsively disabling the transmission of the pilot beacon on the macro-network carrier during subsequent slots of the identified slot cycle for a second number of recurring slots, the second number being greater than the first number.

20. The femtocell of claim 18, wherein the functions further include, after disabling the transmission of the pilot beacon for the first number of slots of the identified slot cycle, re-enabling the transmission of the pilot beacon on the macro-network carrier during subsequent slots of the identified slot cycle.

21. The femtocell of claim 13, wherein the functions further include providing the WCD with wireless service for a period of time despite making the disable determination.

22. The femtocell of claim 13, wherein evaluating whether the WCD is authorized to receive wireless service from the femtocell comprises checking for the presence of an identifier associated with the WCD in a whitelist of WCDs maintained at the femtocell, the set of functions further comprising determining that the WCD is authorized when the identifier associated with the WCD is present in the whitelist.

23. The femtocell of claim 13, wherein evaluating whether the WCD is authorized to receive wireless service from the femtocell comprises (i) transmitting an authorization request to a whitelist database external to the femtocell and (ii) examining a content of an authorization reply received by the femtocell from the whitelist database, the authorization reply being associated with the authorization request.

24. The femtocell of claim 13, wherein the one or more overhead channels comprise at least one channel selected from the group consisting of a pilot channel, a paging channel, and a sync channel.

25. A method comprising:
a femtocell transmitting a pilot beacon on a macro-network carrier, and transmitting one or more overhead channels on a femtocell carrier;
the femtocell receiving a registration request from a wireless communication device (WCD), and evaluating whether the WCD is authorized to receive wireless service from the femtocell;
the femtocell making a disable determination comprising a first determination that the WCD is not authorized to receive wireless service from the femtocell and a second determination that no authorized WCDs that are currently registered with the femtocell are currently using a same or overlapping slot cycle as the unauthorized WCD; and responsive to making the disable determination, the femtocell disabling, during at least one subsequent slot associated with the unauthorized WCD in a periodically recurring slot cycle, at least one transmission selected from the group consisting of (i) one or more of the overhead channels and (ii) the pilot beacon, but the femtocell continuing to provide the at least one transmission in at least one slot that is associated with at least one authorized WCD.

* * * * *